(12) United States Patent  (10) Patent No.: US 7,809,350 B2
Buckley et al.  (45) Date of Patent: Oct. 5, 2010

(54) METHODS AND APPARATUS FOR USE IN COMMUNICATING SHORT MESSAGES OF THE EMERGENCY TYPE FROM MOBILE COMMUNICATION DEVICES

(75) Inventors: Adrian Buckley, Tracy, CA (US); Eniko Sokondar, Richmond (GB); Ian Harris, Devizes (GB)

(73) Assignee: Research In Motion Limited, Waterloo, Ontario (CA)

( * ) Notice: Subject to any disclaimer, the term of this patent is extended or adjusted under 35 U.S.C. 154(b) by 956 days.

(21) Appl. No.: 11/561,554

(22) Filed: Nov. 20, 2006

(65) Prior Publication Data
US 2007/0173224 A1  Jul. 26, 2007

Related U.S. Application Data

(63) Continuation-in-part of application No. 11/286,861, filed on Nov. 23, 2005.

(51) Int. Cl.
*H04M 11/04* (2006.01)
(52) U.S. Cl. ............... 455/404.1; 455/466; 455/550.1; 455/403; 455/422.1; 455/517
(58) Field of Classification Search ............ 455/466, 455/404.1, 403, 422.1, 550.1, 414.2
See application file for complete search history.

(56) References Cited

U.S. PATENT DOCUMENTS

| | | | |
|---|---|---|---|
| 5,680,458 | A | 10/1997 | Spelman et al. |
| 5,937,355 | A * | 8/1999 | Joong et al. ............ 455/466 |
| 6,292,669 | B1 | 9/2001 | Meuronen et al. |
| 6,397,054 | B1 * | 5/2002 | Hoirup et al. ........... 455/521 |
| 6,766,159 | B2 * | 7/2004 | Lindholm ............ 455/404.1 |
| 6,850,768 | B2 | 2/2005 | Foll |
| 7,212,506 | B2 | 5/2007 | Varney et |

(Continued)

FOREIGN PATENT DOCUMENTS

WO  2005020593 A2  3/2005

(Continued)

OTHER PUBLICATIONS

International Search Report and Written Opinion for International Application PCT/CA2006/001866, Mar. 13, 2007.

(Continued)

*Primary Examiner*—Huy Phan
(74) *Attorney, Agent, or Firm*—John J. Oskorep, Esq.

(57) ABSTRACT

In one example, a first message center address associated with a home message center and a second message center address associated with an emergency message center are stored in memory of the mobile device. A user input request for communicating a short message is received through a user interface of the mobile device. If the user input request is identified as being for an emergency message, the second message center address is read from the memory and provided in a message center address field of the short message. The short message having the second message center address in the message center address field is then transmitted by the mobile device to the wireless network. The network identifies the second message center address in the message center address field and, in response, causes the short message to be sent to the emergency message center which is local to the network.

20 Claims, 10 Drawing Sheets

U.S. PATENT DOCUMENTS

| | | | |
|---|---|---|---|
| 7,519,356 B2* | 4/2009 | Miyake et al. | 455/415 |
| 2004/0097246 A1* | 5/2004 | Welch | 455/466 |
| 2004/0103158 A1 | 5/2004 | Vella et al. | |
| 2004/0176123 A1* | 9/2004 | Chin et al. | 455/521 |
| 2004/0198311 A1* | 10/2004 | Aerrabotu et al. | 455/404.1 |
| 2004/0198330 A1 | 10/2004 | Graf et al. | |
| 2005/0020289 A1 | 1/2005 | Kim et al. | |
| 2005/0037728 A1 | 2/2005 | Binzel et al. | |
| 2005/0070315 A1* | 3/2005 | Rai et al. | 455/404.1 |
| 2005/0096008 A1* | 5/2005 | Shin | 455/404.1 |
| 2005/0192035 A1* | 9/2005 | Jiang | 455/461 |

FOREIGN PATENT DOCUMENTS

| | | |
|---|---|---|
| WO | 2005036902 A2 | 4/2005 |
| WO | 2005079421 A2 | 9/2005 |

OTHER PUBLICATIONS

Extended European Search Report, EPO patent Application # 06804746.3, May 25, 2009.

* cited by examiner

METHODS AND APPARATUS FOR USE IN COMMUNICATING SHORT MESSAGES OF THE EMERGENCY TYPE FROM MOBILE COMMUNICATION DEVICES

CROSS-REFERENCE TO RELATED APPLICATION

This patent application claims priority to a U.S. patent application entitled "Routing Of A Short Message Originated By A Mobile Device" having U.S. Ser. No. 11/286,861, and filing date of 23 Nov. 2005, which is hereby incorporated by reference herein.

BACKGROUND

1. Field of the Technology

The present disclosure generally relates to the communication of short messages from a mobile communication device via a wireless communication network, and more particularly to the communication of short messages (i.e. Short Message Service or SMS messages) of the emergency type when the mobile communication device is operating in a visiting (non-home) wireless network outside of its home wireless network.

2. Description of the Related Art

In today's communication systems, a user of a mobile communication device can often communicate by sending a Short Message through the Short Message Service ("SMS"). When the user sends a SMS message, it is usually routed to the user's home network SMS Service Center ("SMS-SC"). For example, if the user's home network were in New York, NY, his SMS messages would be routed to his home network SMS-SC in New York, NY even when he sends an SMS message while is roaming in London, England, and is out of his home network. For most applications, routing SMS messages to the user's home network SMS-SC presents no problem, but there are certain situations, such an SMS message requesting emergency assistance, where it would be preferable for the SMS message to be sent to an SMS-SC in the currently visited network and its content sent on an entity providing local emergency assistance. Presently, to provide local emergency assistance to the user, it would be necessary for a receiving Short Message Entity ("SME") in the user's home network to provide the details of the emergency SMS message to a local SME in the currently visited network where the user requires the emergency assistance. Such mechanisms can be quite complex and costly, and may well introduce delays and ineffective assistance.

SUMMARY

Methods and apparatus for use by mobile communication devices for communicating short messages of the emergency type via wireless communication networks are described herein. In one illustrative example, a first message center address associated with a home message center and a second message center address associated with an emergency message center are stored in memory of the mobile device. The memory may be a removable memory module, such as a Subscriber Identity Module (SIM), for the mobile device. A user input request for communicating a short message is received through a user interface of the mobile device. If the user input request is identified as being for an emergency message, the second message center address is read from the memory and provided in a message center address field of the short message. The short message having the second message center address in the message center address field is then transmitted by the mobile device to the wireless network. The network identifies the second message center address in the message center address field and, in response, causes the short message to be sent to the emergency message center which is local to the network. This way, when the mobile device is visiting a non-home wireless network, the short message may be routed to the appropriate local emergency message center. The mobile device may receive the second message center address over a broadcast channel of the wireless network and store it in association with a wireless network identification of the wireless network. In an alternative technique, an indicator (e.g. a Transport Protocol-ID) of the short message is set to indicate that the short message is an emergency message in lieu of providing the second destination message in the message center address field.

DETAILED DESCRIPTION OF THE PREFERRED EMBODIMENTS

Methods and apparatus for use by mobile communication devices for communicating short messages of the emergency type via wireless communication networks are described herein. In one illustrative example, a first message center address associated with a home message center and a second message center address associated with an emergency message center are stored in memory of the mobile device. The memory may be a removable memory module, such as a Subscriber Identity Module (SIM), for the mobile device. A user input request for communicating a short message is received through a user interface of the mobile device. If the user input request is identified as being for an emergency message, the second message center address is read from the memory and provided in a message center address field of the short message. The short message having the second message center address in the message center address field is then transmitted by the mobile device to the wireless network. The network identifies the second message center address in the message center address field and, in response, causes the short message to be sent to the emergency message center which is local to the network. This way, when the mobile device is visiting a non-home wireless network, the short message may be routed to the appropriate local emergency message center. The mobile device may receive the second message center address over a broadcast channel of the wireless network and store it in association with a wireless network identification of the wireless network. In an alternative technique, an indicator (e.g. a Transport Protocol-ID) of the short message is set to indicate that the short message is an emergency message in lieu of providing the second destination message in the message center address field.

Figure 1:
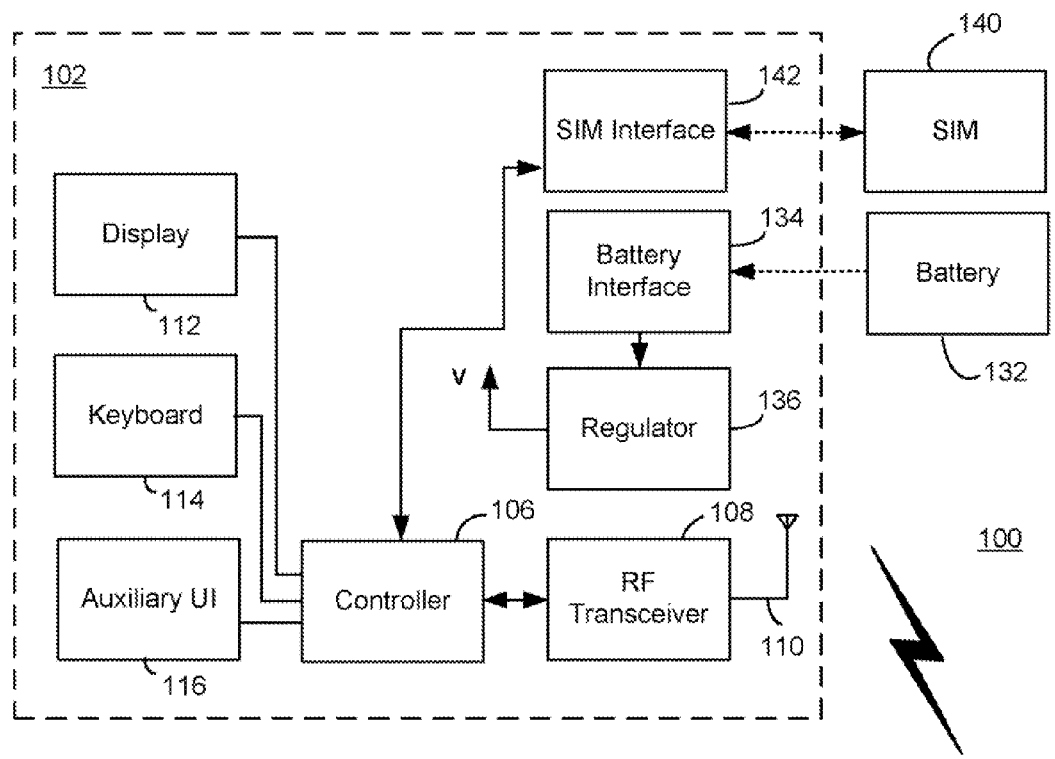
FIG. 1 is a block diagram of a communication system which includes a mobile communication device for communicating via a wireless communication network.
Figure 1:
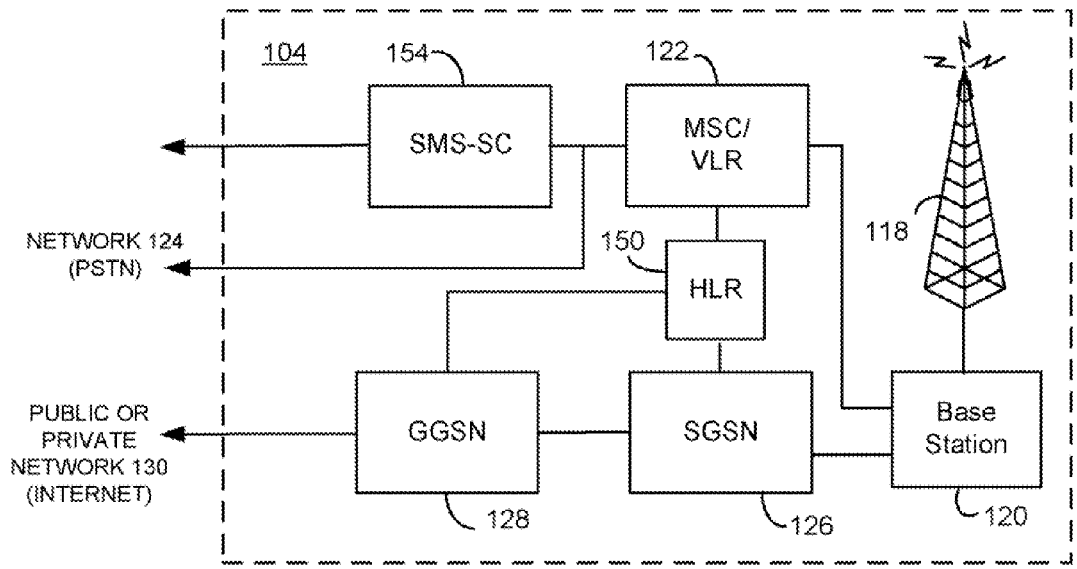

To illustrate basic network architecture, FIG. 1 shows a block diagram of a communication system 100 which includes a mobile communication device 102 which communicates through a wireless communication network 104. In the preferred embodiment, mobile communication device 102 is a mobile station and therefore this term is used substantially throughout the specification. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

In most modern communication devices, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard (preferably a full QWERTY-type keyboard), is normally provided for entering data for storage in mobile station 102, information for transmission to network 104, a telephone number to place a telephone call, commands to be executed on mobile station 102, and possibly other or different user inputs.

Being a handheld, mobile/portable electronic device, mobile station 102 includes a battery interface 134 for receiving and carrying one or more rechargeable batteries 132. Battery 132 provides electrical power to (most if not all) electrical circuitry in mobile station 102, and battery interface 134 provides for a mechanical and electrical connection for battery 132. Battery interface 134 is coupled to a regulator 136 which provides a regulated voltage V for all electrical components of the device.

Mobile station 102 sends communication signals to and receives communication signals from network 104 over a wireless link via antenna 110. RF transceiver circuitry 108 and antenna 110 perform functions similar to those of base station 120 and antenna tower 118, including for example modulation/demodulation and possibly encoding/decoding and encryption/decryption. It will be apparent to those skilled in art that RF transceiver circuitry 108 will be adapted to particular wireless network or networks in which mobile station 102 is intended to operate.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the wireless terminal is not fully operational for communication through wireless network 104. By inserting SIM 140 into the wireless terminal, an end user can have access to any and all of his/her subscribed services. In order to identify the subscriber, SIM 140 contains some user parameters such as an International Mobile Subscriber Identity (IMSI). In addition, SIM 140 is typically protected by a four-digit Personal Identification Number (PIN) which is stored therein and known only by the end user. An advantage of using SIM 140 is that end users are not necessarily bound by any single physical wireless device. Typically, the only element that personalizes a wireless terminal is a SIM card. Therefore, the user can access subscribed services using any wireless terminal equipped to operate with the user's SIM.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above.

In FIG. 1, mobile station 102 communicates through wireless communication network 104. In the embodiment of FIG. 1, wireless network 104 is a network which operates in accordance with Global System for Mobile communications (GSM) and General Packet Radio Service (GPRS) technologies. Wireless network 104 includes a base station 120 with an associated antenna tower 118, a Mobile Switching Center (MSC) 122, a Home Location Register (HLR) 150, a Serving General Packet Radio Service (GPRS) Support Node (SGSN) 126, and a Gateway GPRS Support Node (GGSN) 128. MSC 122 is coupled to base station 120 and to a telephone network, such as a landline network 124 (e.g. Public Switched Telephone Network or PSTN). SGSN 126 is coupled to base station 120 and to GGSN 128, which is in turn coupled to a public or private data network 130 (such as the Internet). HLR 150 is coupled to MSC 122, SGSN 126, and GGSN 128.

Base station 120, including its associated controller and antenna tower 118, provides wireless network coverage for a particular coverage area commonly referred to as a "cell". Base station 120 transmits communication signals to and receives communication signals from mobile stations within its cell via antenna tower 118. Base station 120 normally performs such functions as modulation and possibly encoding and/or encryption of signals to be transmitted to the mobile station in accordance with particular, usually predetermined, communication protocols and parameters, under control of its controller. Base station 120 similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a distinct base station 120 and transceiver, depending upon desired overall expanse of network coverage. All base station controllers and base stations may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 150. In case of a voice call to mobile station 102, HLR 150 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 150 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

MSC 122 is also coupled to a Short Message Service Service Center (SMS-SC) 154 which is a message center for the communication of Short Message Service (SMS) messages. SMS makes use of SMS-SC 154 which acts as a store-and-forward system for relaying short messages. Messages are stored in the network until the destination device becomes available, so an end user can receive or transmit an SMS message at any time, whether a voice call is in progress or not.

Being part of the GPRS network, Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by base station 120 instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

As apparent from the above, the wireless network includes fixed network components including RF transceivers, amplifiers, base station controllers, network servers, and servers connected to network. Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
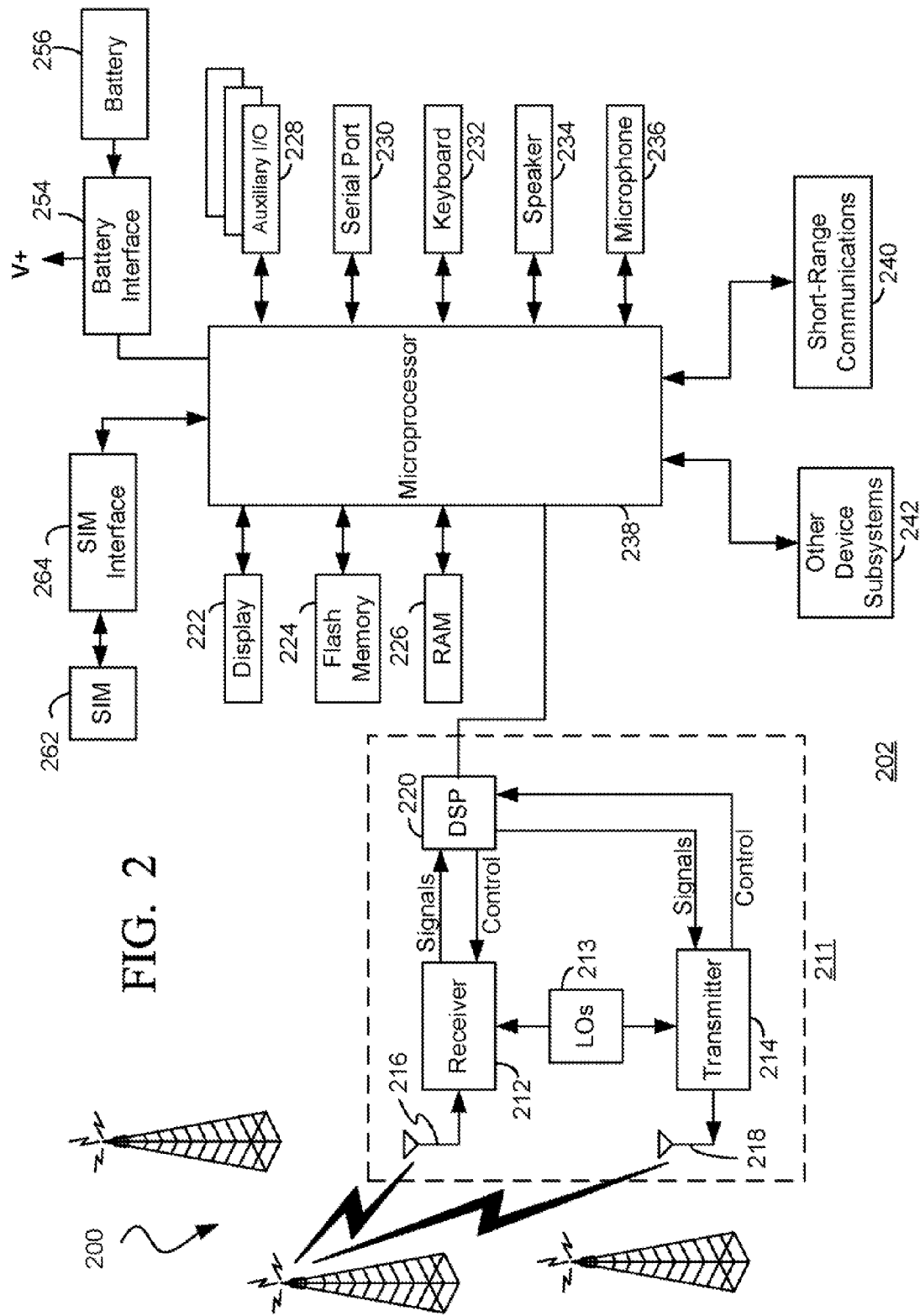
FIG. 2 is a more detailed example of a mobile device used in the wireless network of FIG. 1.

FIG. 2 is a detailed block diagram of a preferred mobile station 202 which may be utilized in system 100 of FIG. 1. Mobile station 202 is a two-way communication device having at least voice and data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) which regulates power to all of the circuitry.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access requirements will also vary depending upon type of network utilized. In GPRS networks, for example, network access is associated with a subscriber or user of mobile station 202. A GPRS device therefore requires a Subscriber Identity Module, commonly referred to as a SIM card (i.e. SIM 262 of FIG. 2), in order to operate on the GPRS network. Without SIM 262 inserted in a SIM interface 264, mobile station 202 would not be fully functional. Local or non-network communication functions (if any) may be operable, but mobile station 202 will be unable to carry out any functions involving communications over the network. SIM 262 includes those features described in relation to FIG. 1 (i.e. those described for SIM 140 of FIG. 1).

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Data and control lines extend between a SIM interface 264 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages or short message service (SMS) messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. The handling and delivery of e-mail message information will be described later below in relation to FIGS. 4-6.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with an end user's desktop computer is a desirable, albeit optional, component. Serial port 230 enables an end user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
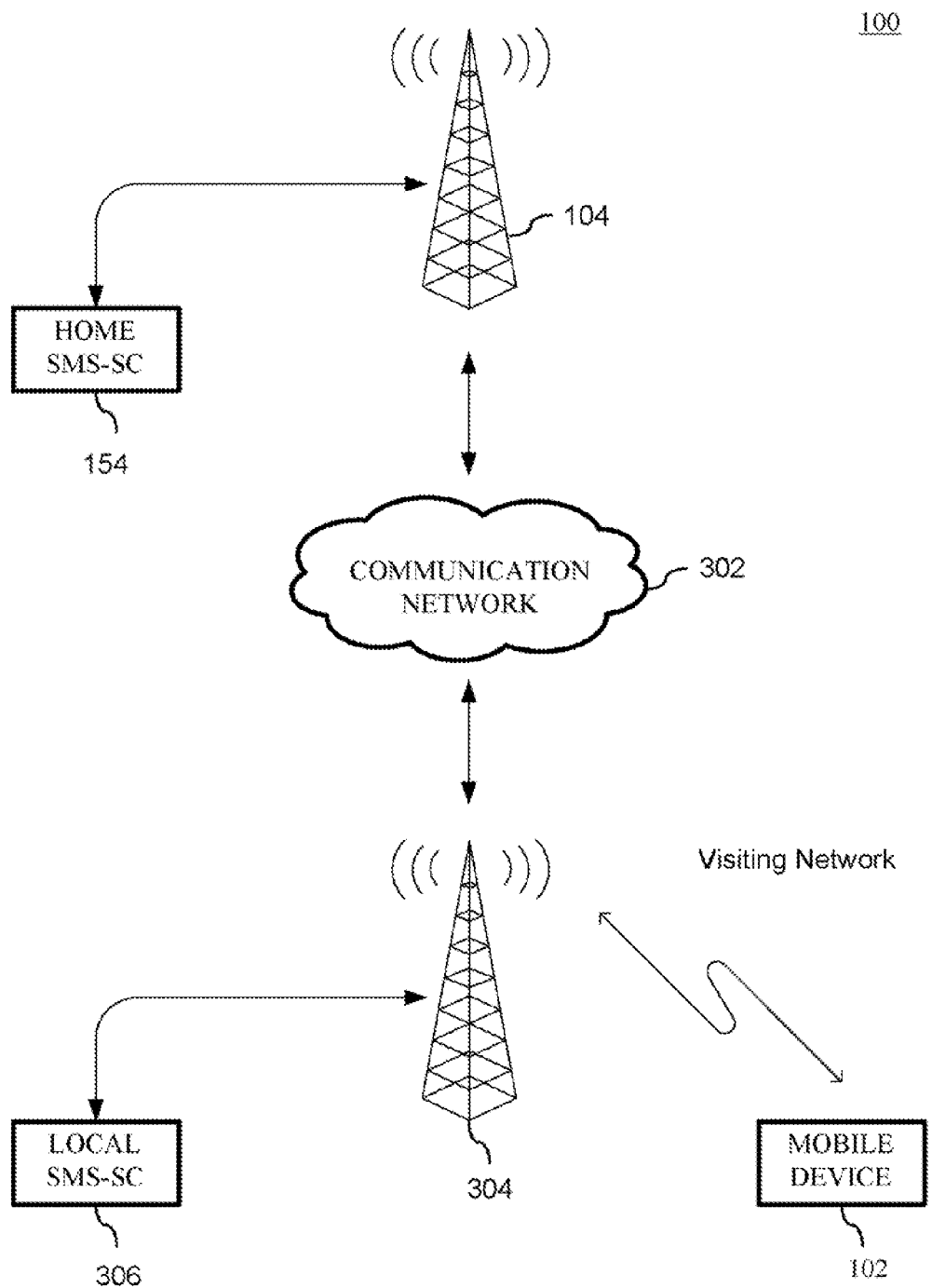
FIG. 3 is a simplified exemplary wireless network environment in which techniques of the present disclosure may be practiced.

FIG. 3 is an exemplary environment of pertinent components of wireless communication system 100 of FIG. 1 in which the present techniques in at least one of the preferred embodiments may be practiced. In this example, mobile device 102 is shown as visiting and being registered in a non-home wireless communication network ("local network") 304 which has a local SMS-SC 306. Normally, an SMS message transmitted by the mobile device 102 will reach its home SMS-SC 154 associated with its home wireless network 110 through local wireless network 304 and a communication network 302 such as a traditional land-line communication network or a wide area network. However, for a certain type of SMS messages, such as an SMS message requesting emergency assistance, the SMS message transmitted from mobile device 102 is routed to local SMS-SC 306 in local wireless network 304, and the content of the SMS message is sent on an entity providing local emergency assistance.

Figure 4:
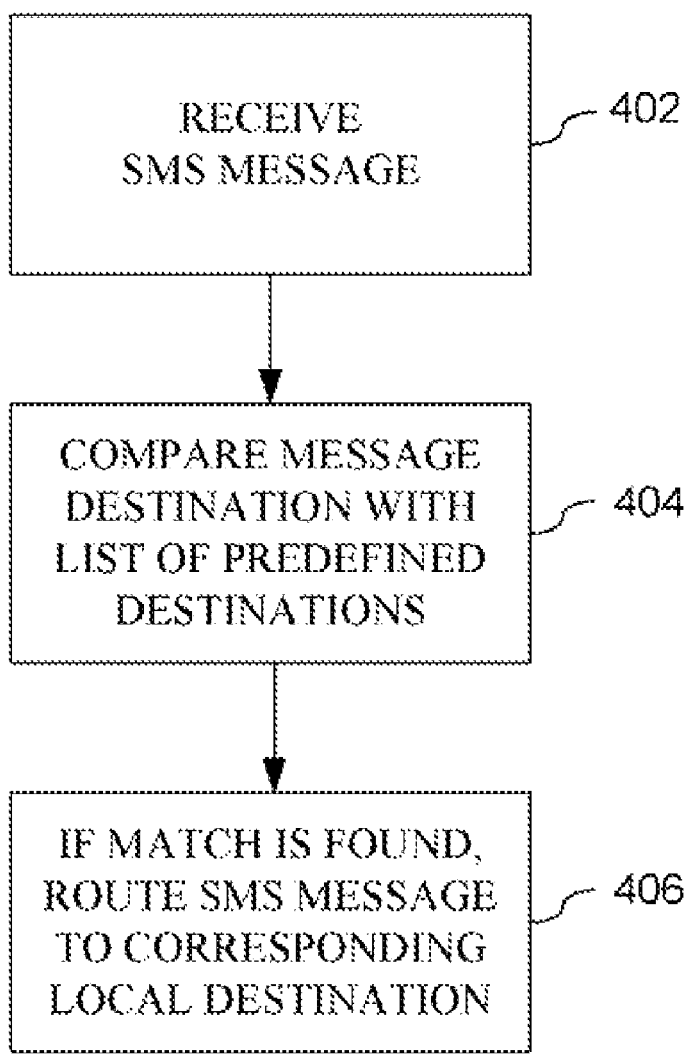
FIG. 4 is an exemplary flowchart illustrating a process of routing a short message of the emergency type originated by the mobile device to a local short message service center.

FIG. 4 is an exemplary flowchart 400 illustrating a process of routing a short message originated by a visiting mobile device (e.g. mobile device 102 in FIG. 3) to a local short message service center (e.g. SMS-SC 306 in FIG. 3) via a local wireless network (e.g. wireless network 304 in FIG. 3) in accordance with at least one of the preferred embodiments. In block 402 of FIG. 4, the local wireless network receives an SMS message having a message destination from the mobile device. Typically, the message destination is the address of the intended recipient which the user of the mobile device manually inserts or selects, known as the Transport Protocol Destination Address ("TP-DA"). In the case of a short message of the emergency type, the TP-DA will be a short telephone code such as "911","112", "999", or any predefined code known to indicate that the short message concerns an emergency situation. The mobile device also automatically inserts routing information (i.e. the address of the home SMS-SC) into the message for delivery.

In response to receiving the message from the mobile device, the local wireless network evaluates the TP-DA and routes the short message to an appropriate SMS-SC. Note that the local wireless network has a stored list of predefined short message destinations, which is used to route the SMS message from the mobile device to an appropriate local destination. The predefined short message destinations may be or include a plurality of emergency center destinations such as, but not limited to, police, fire department, hospital, "911", "112", "999", or any other destinations associated with emergency centers. In block 404 of FIG. 4, the local network compares the message destination (i.e. the TP-DA) with the stored list of predefined short message destinations. If a match is found in block 404, the local wireless network routes the SMS message from the mobile device to a local destination corresponding to the matching predefined short message destination of the list of predefined short message destinations in block 406 of FIG. 4. The local destination may be a local SMS-SC or a locally located emergency center. Each emergency center destination may have a corresponding short message destination for a locally located emergency center. The local wireless network may route the SMS message a local destination in various ways, including by replacing the original message destination with the local destination and transmitting the short message to the local destination; forwarding the short message to the local destination; and generating a new short message having the local destination, appending the original short message to the new short message, and transmitting the new short message having the appended short message to the local destination.

Figure 5:
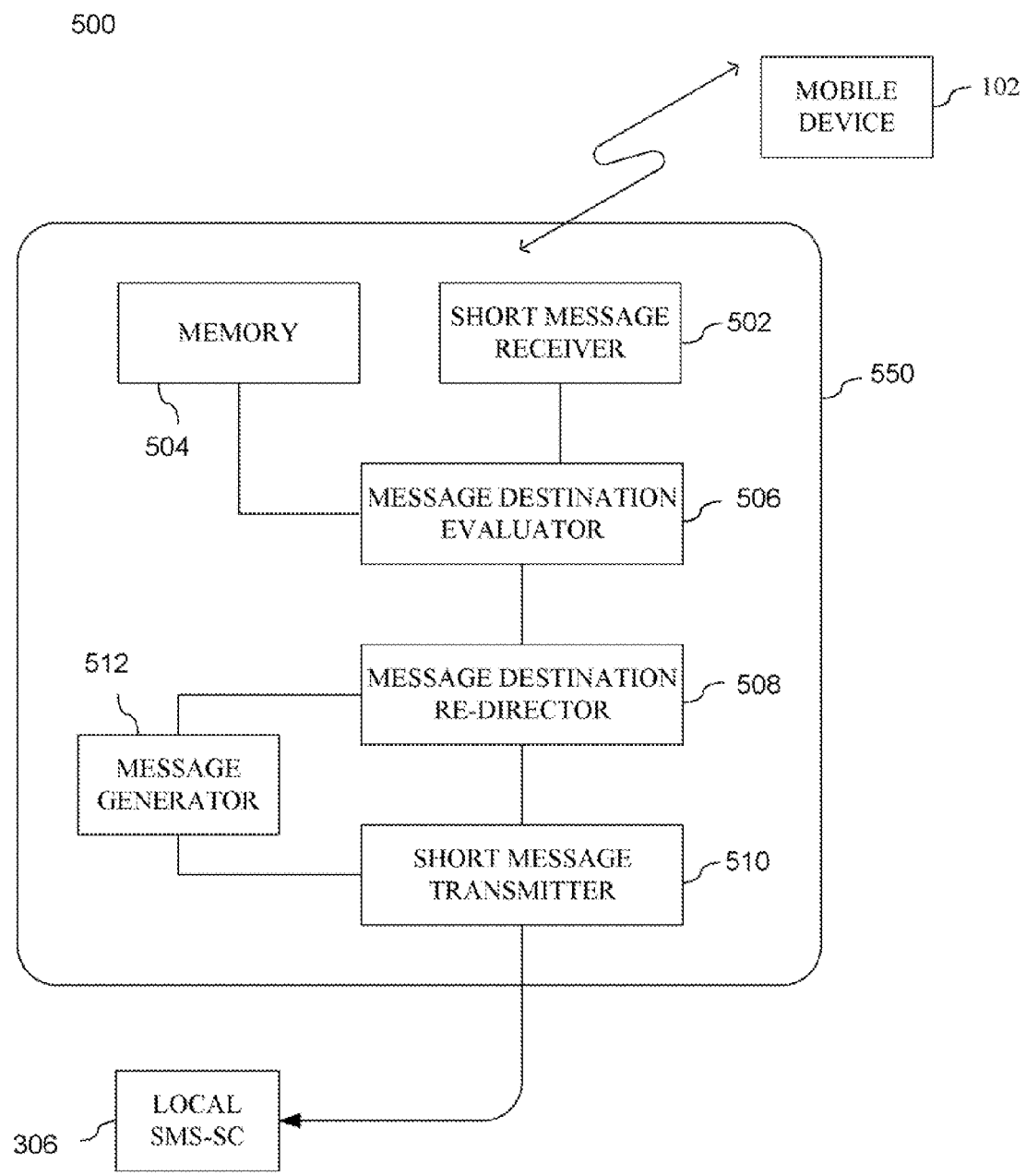
FIG. 5 is an exemplary block diagram of the wireless communication network configured to route the short message to a local destination according to FIG. 4.

FIG. 5 is an exemplary block diagram 500 of network components of the local wireless network configured to route the short message of the emergency type to the local destination in accordance with FIG. 4. Local wireless network 104 has a short message receiver 550 configured to receive a short message having a message destination from a locally registered mobile device such as the mobile device 102 of FIGS. 1-3. Local wireless network 104 has a memory device 504, which is configured to store the previously described list of predefined short message destinations. A message destination evaluator 506 is coupled to both short message receiver 550 and memory 504, and is configured to match the message destination with a predefined short message destination of the list of predefined short message destinations in memory 504. A message destination re-director 508 is couple to message destination evaluator 506, and is configured to re-direct the short message to a local destination corresponding to the matching predefined short message destination of the list of predefined short message destinations. Message destination re-director 508 may be further configured to replace the message destination with the local destination. A short message transmitter 510 is coupled to message destination re-director 508 and is configured to transmit the short message to the local destination (such as the local SMS-SC 306 of FIG. 3). Short message transmitter 510 may be further configured to forward the short message to the local destination. Local wireless network 304 may also have a message generator 512 coupled to message destination re-director 508 and short message transmitter 510, and configured to generate a new short message having the local destination and to append the short message to the new short message.

Figure 6:
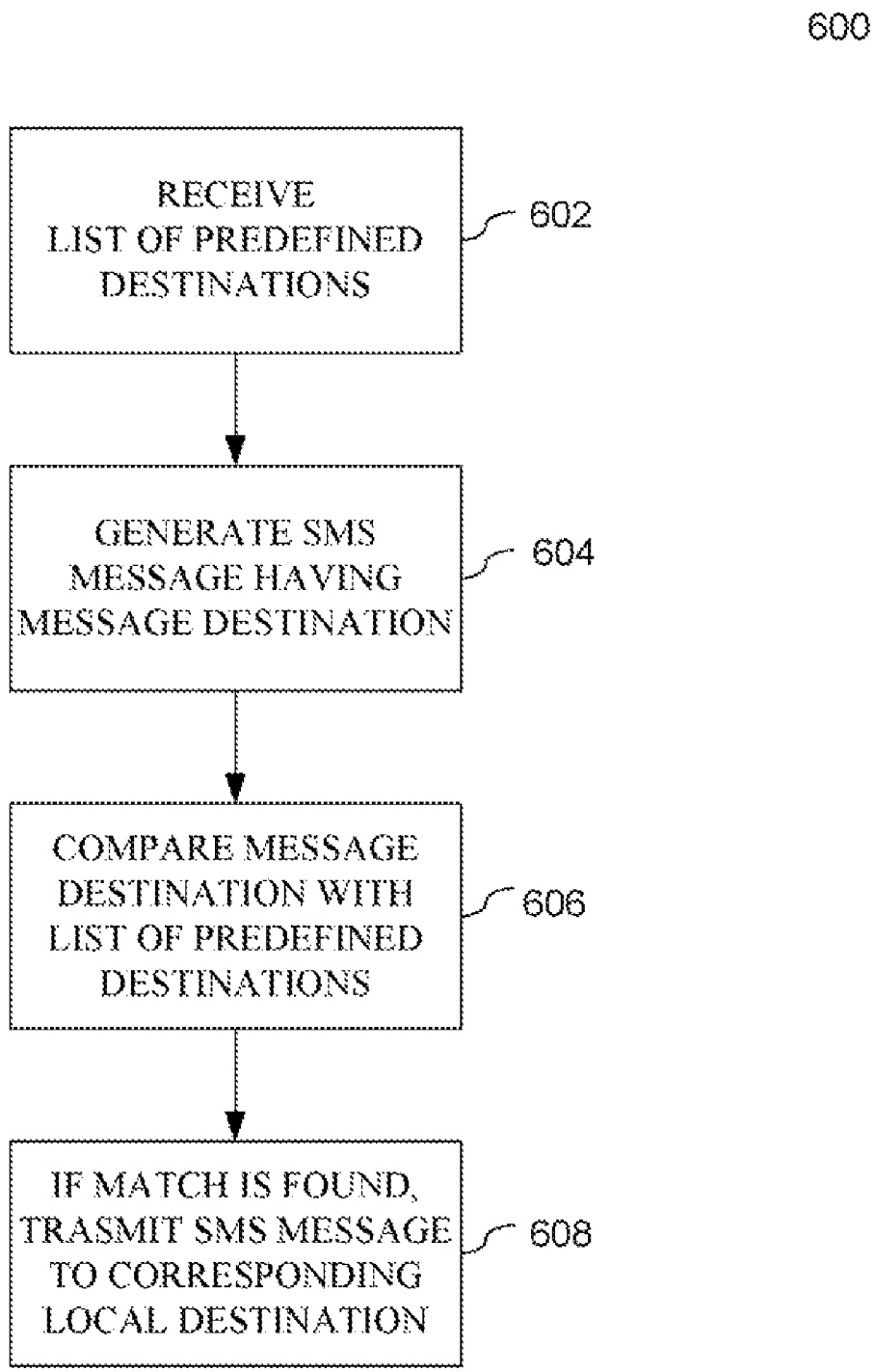
FIG. 6 is an exemplary flowchart illustrating a process of routing a short message of the emergency type originated by the mobile device to a local short message service center.

Alternatively, the mobile device may itself direct the SMS message to an appropriate local destination, such as the local SMS-SC. To illustrate, FIG. 6 is an exemplary flowchart 600 illustrating a process of routing the SMS message originated by the mobile device to the local SMS-SC by the mobile device in accordance with at least one of the preferred embodiments. The mobile device may utilize its one or more processors (e.g. microprocessor) to perform the steps of the method, or more particularly the functional components described later in relation to FIG. 7.

In block 602 of FIG. 6, the mobile device receives a list of predefined short message destinations, which has been described previously. The mobile device may receive the list of predefined short message destinations upon registering in a non-home network of the mobile device, such as the local network 304. In block 604 of FIG. 6, the mobile device generates an SMS message having a message destination. Typically, as described earlier, the message destination is the address of the intended recipient which the user of the mobile device manually inserts or selects, known as the Transport Protocol Destination Address ("TP-DA"). In the case of a short message of the emergency type, the TP-DA will be a short telephone code such as "911", "112", "999", or any predefined code known to indicate that the short message concerns an emergency situation. The mobile device also automatically inserts routing information (i.e. the address of the home SMS-SC) into the message for delivery as well.

The mobile device compares the message destination with the list of predefined short message destinations in block 606 of FIG. 6. If the message destination matches a predefined short message destination of the list of predefined short message destinations, the mobile device transmits the SMS message to a local destination corresponding to the matching predefined short message destination of the list of predefined short message destinations in block 608 of FIG. 6. The mobile device may transmit the SMS message to the local destination by replacing the original message destination with the local destination corresponding to the matching predefined short message destination of the local list of predefined local destination, for example.

Figure 7:
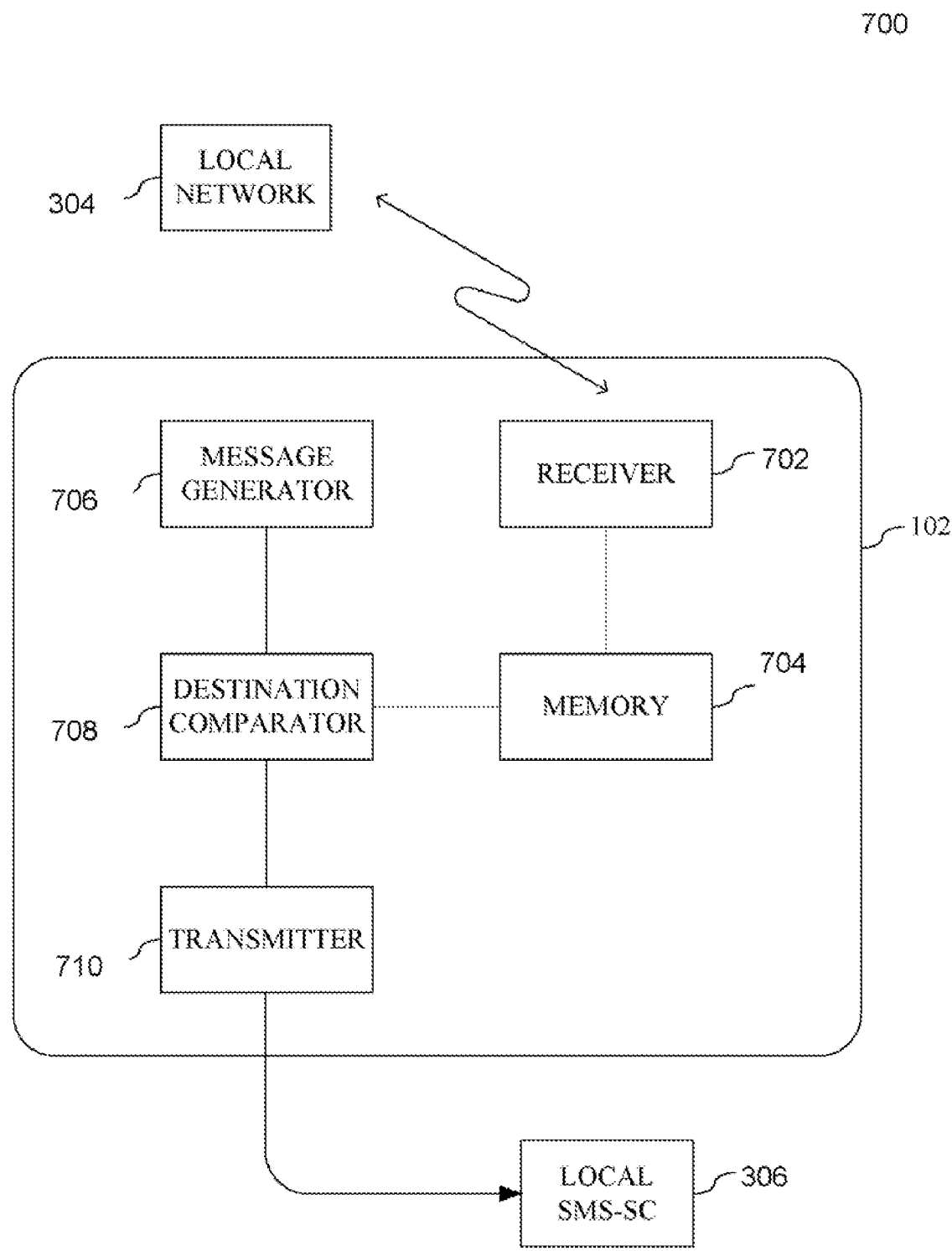
FIG. 7 is an exemplary block diagram of pertinent components of the mobile device configured to route the short message to a local destination according to FIG. 6.

FIG. 7 is an exemplary block diagram 700 of mobile device 102 which is configured to route a short message to the local SMS-SC in accordance with FIG. 6. Mobile device 102 may embody the functional components of FIG. 7 in its one or more processors (e.g. microprocessor). As shown, mobile device 102 has a receiver 702 which is configured to receive the list of predefined short message destinations previously described from local wireless network 304. Mobile device 102 also has a memory device 704 coupled to receiver 702 which is configured to store the list of predefined short message destinations. Receiver 702 may be configured to receive the list of predefined short message destinations only after mobile device 102 registers in a non-home network, such as the local wireless network 304. Mobile device 102 also has a short message generator 706, which is configured to generate a short message having a message destination. A destination comparator 708 is coupled to memory device 704 and short message generator 706, and is configured to match the message destination with a predefined short message destination of the list of predefined short message destinations stored in memory device 704. A transmitter 710 is coupled to destination comparator 709, and is configured to transmit the short message to a local destination corresponding to the matching predefined short message destination of the list of predefined short message destinations. Destination comparator 708 may be further configured to replace the message destination with the local destination corresponding to the matching predefined short message destination of the local list of predefined local destination.

Figure 8:
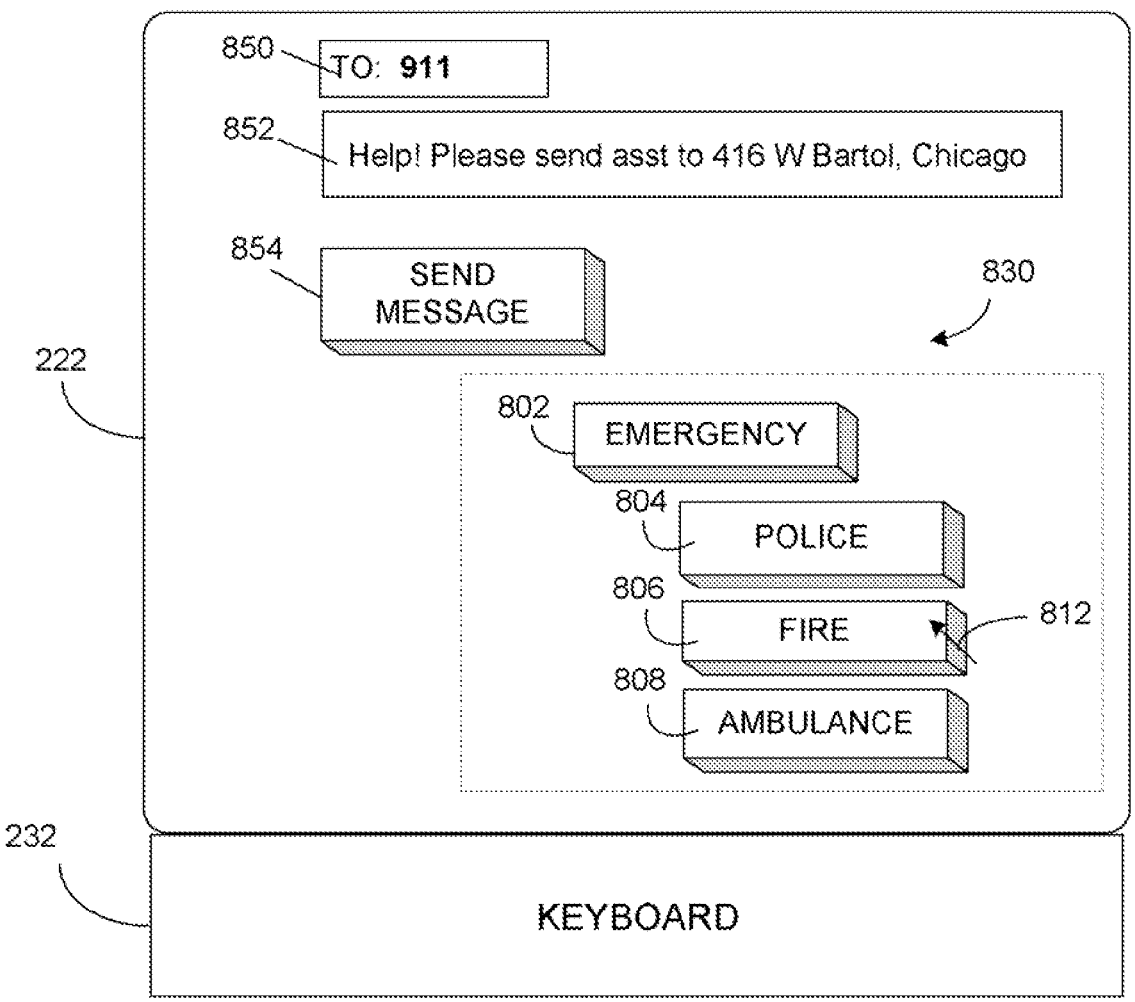
FIG. 8 is an illustrative example of a visual display of the mobile device which displays prompts for use in sending short messages of the emergency type from the mobile device.

FIG. 8 is an illustrative example of visual display 222 of the mobile device for displaying information and prompts for use in initiating short messages from the mobile device. The user interface methods to be described may be employed in any technique described herein for originating short messages from the mobile device. In general, the processor of the mobile device may be operative to cause the information and prompts of FIG. 8 to be displayed in visual display 222 in response to a user's input request to send a short message. The processor receives alphanumeric text information for the short message in an alphanumeric text input field 852, which may be manually entered by the user via the user interface via keyboard 232 or the like. In FIG. 8, the alphanumeric text information in alphanumeric text input field 852 indicates that the short message is of the emergency type, reciting "Help! Please send asst to 416 W Bartol, Chicago". The processor also receives destination address information (for a telephone number or code) in a destination field 850 for the short message, which may be manually entered by the user via keyboard 232 or the like as well. In FIG. 8, the destination address information indicates that the short message is of the emergency type, as it is a short telephone code for "911".

The processor may cause one or more of a plurality of visual prompts 830 to be displayed in visual display 222. Any one of visual prompts 830 may be selected or actuated by the user of the mobile device using any suitable input device of the mobile device, such as keyboard 232 (e.g. up/down and left/right keys), scrollwheel, trackball, as examples, which may utilize a cursor 812 or position marker.

In FIG. 8, visual prompts 830 include a send message prompt 854 for use in sending short messages in a general, standard fashion. Visual prompts 830 may also include an emergency message prompt 802 for use in sending short messages of the emergency type for general emergency services. Other visual prompts 830 which may be displayed are more specific and include an emergency message prompt 804 for police services, an emergency message prompt 806 for fire services, and an emergency message prompt 808 for ambulance/hospital services, as examples. Although visual prompts 830 are shown in FIG. 8 as graphical user interface (GUI) type user-actuable objects, visual prompts 830 may be alternatively be displayed as functions in a list of menu functions. More generally, any suitable emergency function may be provided in the user interface for use in sending emergency messages. When alphanumeric text information in alphanumeric text input field 852 has been entered, and one of visual prompts 830 has been actuated or selected by the user, the processor causes the short message to be processed and sent to the appropriate destination.

In one variation, any one or all of visual prompts 802, 804, 806, and 808 for emergency services may be displayed prior to and/or in lieu of the display of any destination address field 850 and/or alphanumeric text input field 852. In this case, the user navigates through options presented in visual display 222 until visual prompts 802, 804, 806, and 808 for emergency services are displayed. Depending on the situation, the user actuates or selects one of the visual prompts 802, 804, 806, or 808 corresponding to the emergency situation via the user interface. A detection of the actuation of one of these visual prompts 802, 804, 806, or 808 causes the processor to identify or select the appropriate destination/routing information corresponding to visual prompt 802, 804, 806, or 808 from its memory, insert such information in the message for delivery (e.g. see discussion later below), and to display alphanumeric text input field 852 for the user to manual enter alphanumeric text information via the user interface. The selected destination address and destination address field 850 may or may not be displayed in visual display 222. In another variation, the alphanumeric text information may be predefined alphanumeric text information which is pre-populated by the processor of the mobile device without any manual entry of text required by the user.

Thus, with use of visual prompts 802, 804, 806 and 808, the user need not attempt to enter any destination address but only to select an appropriate visual prompt 802, 804, 806, and 808 corresponding to the emergency situation. This may be especially important in cases where the user is unfamiliar with the visiting location where such destination addresses may be unknown or different from those at the home location.

Figure 9:
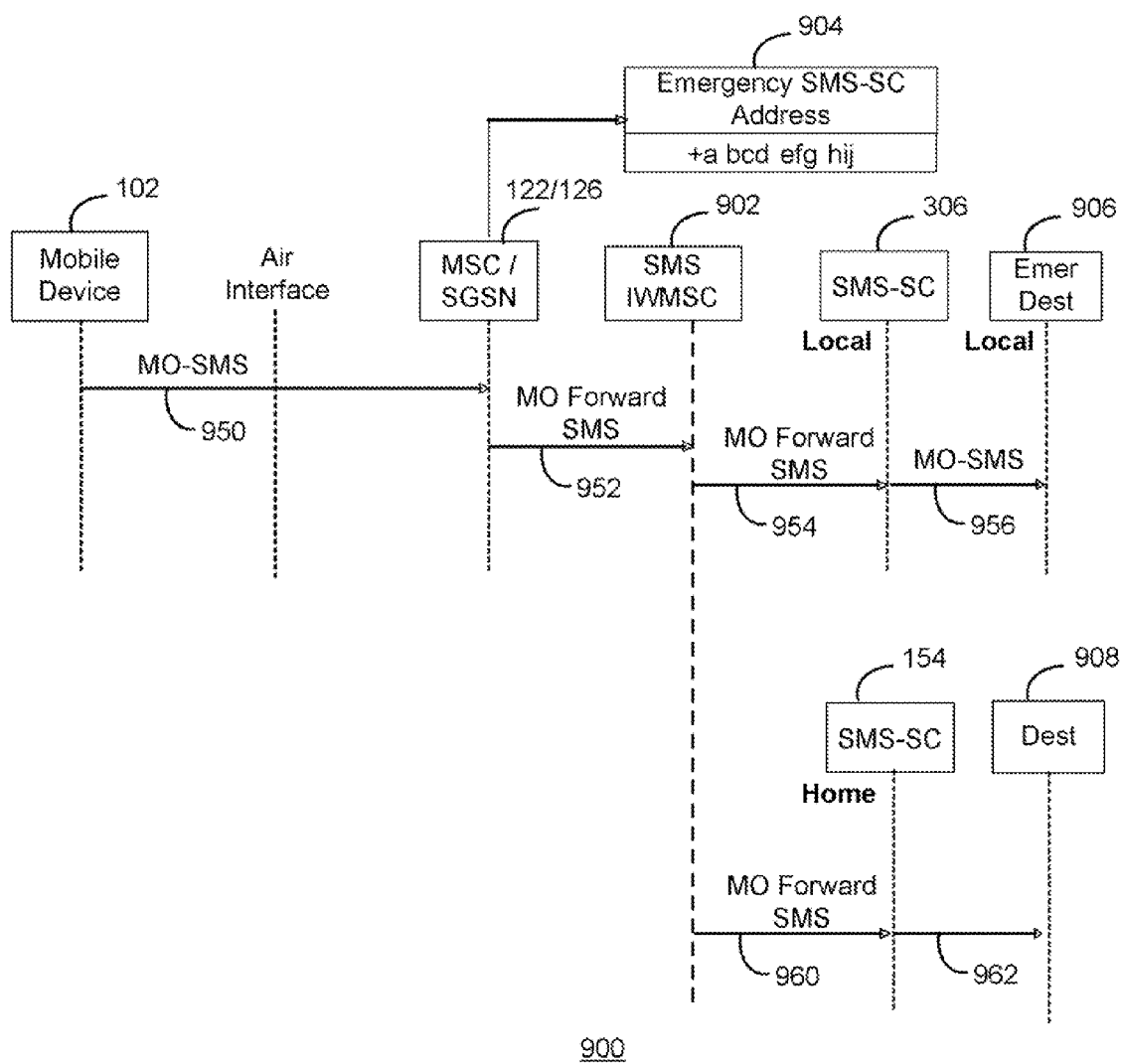
FIG. 9 is a process flow diagram for describing a method for use in communicating short messages of the emergency type originating from the mobile device.

FIG. 9 is a process flow diagram for describing a method for use in communicating short messages of the emergency type originating from the mobile device. The techniques described in relation to FIG. 9 may be performed by the mobile communication device utilizing its one or more processors (e.g. microprocessor). Complementary techniques may be performed by one or more network entities or components in the wireless network, such as the Mobile Switching Center (MSC) or the Serving General Packet Radio Service (GPRS) Support Node (SGSN).

For communicating short messages in relation to the process of FIG. 9, memory of mobile device 102 stores a first message center address associated with a home message center and a second message center address associated with an emergency message center. Preferably, the memory used to store the first and the second message center addresses is a removable memory module, such as a SIM. As an example, the second message center address may be stored in the removable memory module (e.g. SIM) as provided in Table 1 below (see offset fields Y+19 to Y+30):

TABLE 1

Address Field for Emergency Service Center Address.

| Identifier: '6F42' | Structure: linear fixed | Optional |
|---|---|---|
| Record length: 28 + Y bytes | | Update activity: low |

Access Conditions:

| READ | PIN |
|---|---|
| UPDATE | PIN |
| DEACTIVATE | ADM |

TABLE 1-continued

Address Field for Emergency Service Center Address.

ACTIVATE         ADM

| Bytes | Description | M/O | Length |
|---|---|---|---|
| 1 to Y | Alpha-Identifier | O | Y bytes |
| Y + 1 | Parameter Indicators | M | 1 byte |
| Y + 2 to Y + 13 | TP-Destination Address | M | 12 bytes |
| Y + 14 to Y + 25 | TS-Service Centre Address | M | 12 bytes |
| Y + 26 | TP-Protocol Identifier | M | 1 byte |
| Y + 27 | TP-Data Coding Scheme | M | 1 byte |
| Y + 28 | TP-Validity Period | M | 1 byte |
| Y + 19 to Y + 30 | Emergency Service Centre Address | | 12 bytes |

As another example, the second message center address may be stored in a new field of the removable memory module as provided in Table 2 below (see bytes 1-12):

TABLE 2

Address Field for Emergency Service Center Address.

| Identifier: 'XXXX' | Structure: linear fixed | Optional |
|---|---|---|
| Record length: 12 bytes | | Update activity: Low |

Access Conditions:

| READ | PIN |
| UPDATE | PIN |
| DEACTIVATE | ADM |
| ACTIVATE | ADM |

| Bytes | Description | M/O | Length |
|---|---|---|---|
| 1 to 12 | Emergency Service Centre Address coded TS24.011 | M | 12 bytes |

The second message center address may be referred to as a "global title" address having a valid format in accordance with E.164 or other suitable format type (e.g. E.212 or E.214). The second message center address may be an address that associates directly with the emergency message center or, alternatively, an address that associates indirectly with the message center where multiple communication hops in the network are performed until the appropriate emergency message center is reached. Alternatively, the second message center address may not be a valid address but rather merely serve as an indication for the network to perform emergency message routing for the short message, where the proper message center address for the emergency message center is identified from a stored table based on the second message center address indication in the short message and inserted in the short message for routing.

To begin with respect to FIG. 9, mobile device 102 originates the communication of a short message via the wireless communication network (step 950 of FIG. 9). The short message is indicated as a mobile-originated (MO) SMS or "MO-SMS" in FIG. 9. This short message may or may not be an emergency message. The short message may be input in mobile device 102 in any of the ways described above in relation to FIGS. 6-8, for example. In general, the processor of mobile device 102 identifies a user input request from the user via the user interface for communicating the short message. The processor identifies whether the user input request is for the emergency message, and this may be detected in any of the ways described above in relation to FIGS. 6-8, for example.

If the user input request is identified as being for a non-emergency message, the processor reads the first message center address from the memory and provides the first message center address in a message center address field of the short message. If, on the other hand, the user input request is identified as being for an emergency message, the processor reads the second message center address from the memory and provides the second message center address in the message center address field of the short message. In the present embodiment, the message center address field may be an RP-Data Destination Address field of the short message (see specification document TS 24.011, section 7.3.1.2). The short message is then transmitted via the wireless communication network over the air interface in step 950 of FIG. 9. In general, when the short message is an emergency message, the second message center address in the short message is used by the network to identify that the short message is of the emergency type.

Based on identifying this address, the network essentially intercepts such message and directs it to the appropriate local message center for emergency message handling and forwarding to the appropriate emergency destination. When mobile device 102 is visiting a non-home wireless network, this local message center is not the home message center of the home wireless network.

Details regarding network handling and processing of the short message is now described. The short message originated by mobile device 102 is received and processed by any suitable network node or component, such as MSC 122 or SGSN 126. Note that short messages of the emergency type are processed by the network with a higher priority over and in advance of short messages of the non-emergency type. Assuming operation by MSC 122, MSC 122 is operative to read the message center address, insert it into a service center address field of the short message, and forward the short message for further processing in the network. In the present embodiment, the service center field is a ServiceCentreAddressOA field of the TS29.002 MO-Forward SMS OPERATION. In addition, the short message is forwarded to a Signaling Connection Control Part (SCCP), which may be a part of MSC 122.

In response to receiving the message, the SCCP operates to read the service center address from the forwarded short message and compare it with a stored address associated with emergency message handling (see e.g. emergency SMS-SC address 904 of FIG. 9). In the present embodiment, the stored address is the same fixed address or indication for all carriers for emergency messaging or handling (global or regional). Note that, at this layer, the message center address of the short message may be referred to as an E.164 Global Title Address. If there is a match between the service center address of the short message and the stored address, then the SCCP operates to replace the message center address to a message center address corresponding to a local message center (e.g. SMS-SC 306) assigned to process emergency messages. Again, note that short messages of the emergency type are processed by the network with a higher priority over and in advance of short messages of the non-emergency type. Otherwise, the message center address of the short message is not changed to that corresponding to the local emergency message center. Alternatively, if there is a match based on the comparison, the SCCP operates to set the destination (e.g. Destination Point Code or DPC in the Message Transfer Part or MTP layer) to correspond to the local message center (e.g. SMS-SC 306) assigned to process emergency messages; otherwise, the destination of the short message is not changed to correspond to the local emergency message center.

Thus, if the short message is of the emergency type, the short message is communicated from the SCCP and routed through an SMS Interworking MSC (SMS IWMSC) 902 (step 952 of FIG. 9) to the local message center (e.g. SMS-SC 306) associated with the message center address (step 954 of FIG. 9). SMS-SC 306 may then appropriately route the short message to a local emergency destination 906 (police, fire, ambulance, etc.) (step 956 of FIG. 9). As apparent, when mobile device 102 is visiting a non-home wireless network, the local message center (e.g. SMS-SC 306) is indeed local and not the home message center of the home wireless network; therefore the emergency message is properly communicated to local authorities at or near the visited wireless network instead of home authorities at or near the home wireless network. On the other hand, if the short message is of the non-emergency type, then the short message is communicated from the SCCP and routed through SMS IWMSC 902 (step 952 of FIG. 9) (or other SMS IWMSC) to home message center (e.g. SMS-SC 154) associated with the message center address (step 960 of FIG. 9). Home SMS-SC 154 may then appropriately route the short message to a destination 908 as indicated previously by the user when originating the short message (step 962 of FIG. 9).

Figure 10:
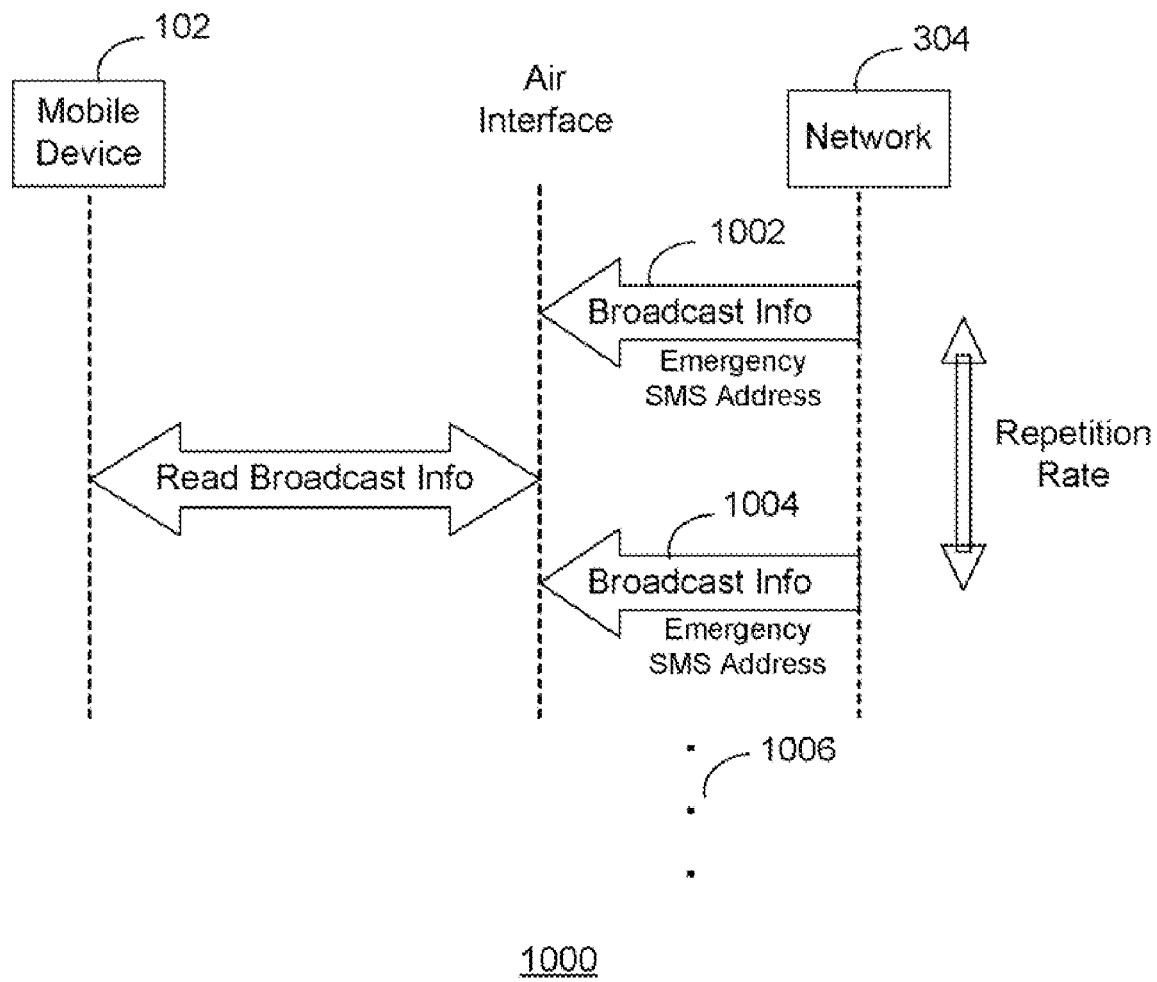
FIG. 10 is a process flow diagram for describing a method for use in broadcasting emergency address information via the wireless network.

In one particular embodiment, the second message center address for emergency services may be regularly or periodically broadcasted over a broadcast or control channel by wireless communication networks for receipt, storage, and use by mobile communication devices for such purposes. This is particularly useful when the second message center address represents the actual direct or indirect address of the local message center which handles emergency messages. To illustrate, FIG. 10 is a basic process flow diagram for describing a method for use in broadcasting emergency address information via the wireless network. As revealed in FIG. 10, broadcast information 1002, 1004, and 1006 is regularly or periodically broadcasted by wireless network 304 at a specified repetition rate. Mobile communication devices operating in wireless network 304, such as mobile device 102 regularly or periodically receive such broadcast information as store it in memory. Since wireless network 304 may change the emergency address or other information from time to time, the most current broadcast information is always utilized by the mobile devices for short message processing. When updated address information is received, mobile device 102 operates to store the updated address information to thereby replace the previous address information.

The second message center address may be stored in memory of the mobile device in association with a wireless network identification of the wireless communication network. For example, the wireless network identification may be or include a PLMN identification, Mobile Country Code (MCC) and Mobile Network Code (MNC) pairs, or System Identifications (SID), etc. Table 3 below illustrates one way in which the second message center address may be stored in memory (e.g. the removable memory module) of the mobile device:

TABLE 3

Address Field for Emergency Service Center Address Associated With Wireless Network Identification.

| Identifier: 'XXXX' | Structure: linear fixed | Optional |
|---|---|---|
| Record length: 15 bytes | | Update activity: high |

Access Conditions:

| READ | ALW |
|---|---|
| UPDATE | ALW |
| DEACTIVATE | ADM |
| ACTIVATE | ADM |

| Bytes | Description | M/O | Length |
|---|---|---|---|
| 1 to 12 | Emergency Service Centre Address coded TS24.011 - item 18 | M | 12 bytes |
| 13-15 | PLMN - coded as TS24.008 - item 19 | M | 3 bytes |

Thus, mobile device 102 may maintain storage of emergency message center addresses for a particular wireless network, and may store a plurality of such addresses associated with a number of different wireless networks. This way, when mobile device 102 is roaming or visiting a non-home wireless network (e.g. wireless network 304), it may utilize the emergency message center address for that particular wireless network.

The following Table 4 is an example which illustrates one format in which the emergency message center address may be broadcasted over the broadcast or control channel by the wireless network:

TABLE 4

Broadcast Information Which Includes Emergency Address.

| IEI | Information element | Presence | Format | length |
|---|---|---|---|---|
| | L2 pseudo length | M | V | 1 |
| | RR management Protocol Discriminator | M | V | ½ |
| | Skip Indicator | M | V | ½ |
| | System Information Type X Message Type | M | V | 1 |
| | Emergency SMS-C address | M | TLV | 3-19 |

In an alternative technique, an indicator of the short message is set to indicate that the short message is an emergency message in lieu of providing the second destination message in the message center address field. Using such technique, the message center address may remain as the home message center address or other suitable address prior to transmission from the mobile device. More explicitly, if the user input request is identified as being for an emergency message, the indicator in the short message is set by the mobile device to indicate that the short message is an emergency message. If, on the other hand, the user input request is identified as being for a non-emergency message, the indicator in the short message is set by the mobile device to indicate that the short message is not an emergency message.

Preferably, the indicator is set appropriately in a Transport Protocol Identifier (TP-ID) field of the short message. The indicator in the TP-ID for emergency message handling may be provided as illustrated below in the example:

| TP-ID Field | |
| --- | --- |
| Bits 543210 | Description |
| 000000 | Short Message Type 0 |
| 000001 | Replace Short Message Type 1 |
| 000010 | Replace Short Message Type 2 |
| 000011 | Replace Short Message Type 3 |
| 000100 | Replace Short Message Type 4 |
| 000101 | Replace Short Message Type 5 |
| 000110 | Replace Short Message Type 6 |
| 000111 | Replace Short Message Type 7 |
| 001000 | Emergency SMS (NEW) |
| 001001 . . . 011101 | Reserved |

Processing of the short message by the network may be performed the same way as previously described in relation to FIG. 9, except that the MSC/SGSN operates to read the indicator from the forwarded short message and compare it with a stored indicator for emergency message handling. If there is a match between the indicator of the short message and the stored indicator, then the MSC/SGSN operates to replace the message center address to a message center address corresponding to a local message center (e.g. SMS-SC 306) assigned to process emergency messages; otherwise the short message is processed in the normal manner where the message center address (e.g. home message center address) in the message center address field is left unchanged.

Thus, methods and apparatus for use by mobile communication devices for communicating short messages of the emergency type via wireless communication networks have been described. In one illustrative example, a first message center address associated with a home message center and a second message center address associated with an emergency message center are stored in memory of the mobile device. The memory may be a removable memory module, such as a Subscriber Identity Module (SIM), for the mobile device. A user input request for communicating a short message is received through a user interface of the mobile device. If the user input request is identified as being for an emergency message, the second message center address is read from the memory and provided in a message center address field of the short message. The short message having the second message center address in the message center address field is then transmitted by the mobile device to the wireless network. The network identifies the second message center address in the message center address field and, in response, causes the short message to be sent to the emergency message center which is local to the network. This way, when the mobile device is visiting a non-home wireless network, the short message may be routed to the appropriate local emergency message center. The mobile device may receive the second message center address over a broadcast channel of the wireless network and store it in association with a wireless network identification of the wireless network.

In an alternative technique, an illustrative technique for use by a mobile communication device in communicating a short message of the emergency type via a wireless communication network involves the acts of receiving, through a user interface, a user input request for communicating a short message; providing a message center address corresponding to a home message center in a message center address field of the short message; if the user input request is identified as being for an emergency message: setting an indicator in the short message to indicate that the short message is an emergency message; if the user input request is identified as being for a non-emergency message: setting the indicator in the short message to indicate that the short message is not an emergency message; and causing the short message to be transmitted to the wireless communication network. The indicator in the short message comprises a Transport Protocol Identifier (TP-ID).

In a further embodiment, an illustrative technique for use by a network node (such as a mobile switching center or Serving GPRS Switching Node) in communicating a short message of the emergency type from a mobile communication device through a wireless communication network involves the acts of receiving a short message having a destination address in a destination address field, a message center address in a message center address field which corresponds to a home message center, and an indicator in an indicator field which indicates whether the short message is an emergency message; causing the short message to be routed to the home message center based on the message center address if the indicator indicates that the short message is a non-emergency message; and causing the short message to be routed to an emergency message center different from the home message center if the indicator indicates that the short message is an emergency message.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for use by a mobile communication device in communicating a short message of the emergency type via a wireless communication network, the mobile communication device including a user interface and a memory
for storing a first message center address associated with a home message center and a second message center address associated with an emergency message center, the method comprising the acts of:
receiving, through the user interface, a user input request for communicating a short message;
if the user input request is identified at the mobile communication device as being for an emergency message:
reading the second message center address from the memory and providing the second message center address in a message center address field of the short message; and
causing the short message with the second message center address in the message center address field to be transmitted, via the wireless communication network, for communication to the emergency message center.

2. The method of claim 1, further comprising:
if the user input request is identified at the mobile communication device, as being for a non-emergency message:
reading the first message center address from the memory and providing the first message center address in a message center address field of the short message; and
causing the short message with the first message center address in the message center address field to be transmitted for communication via the wireless communication network to the home message center.

3. The method of claim 1, comprising the further act of:
providing the memory for storing the first message center address and the second message center address comprises providing a removable memory module in the mobile communication device.

4. The method of claim 1, further comprising:
receiving, at the mobile communication device, the second message center address over a broadcast channel of the wireless communication network.

5. The method of claim 1, further comprising:
receiving, at the mobile communication device. the second message center address over a broadcast channel of the wireless communication network; and
storing the second message center address received over the broadcast channel in the memory which comprises a removable memory module.

6. The method of claim 1, further comprising;
receiving, at the mobile communication device, the second message center address over a broadcast channel of a wireless communication network;
storing the emergency message center address in association with a wireless network identification of the wireless communication network in the memory.

7. The method of claim 1, further comprising;
each time the mobile communication device operates with a new one of a plurality of wireless communication networks:
receiving, at the mobile communication device, the second message center address over a broadcast channel of a wireless communication network; and
storing the second message center address in association with a wireless network identification of the wireless communication network in the memory.

8. The method of claim 1, further comprising:
identifying. at the mobile communication device, whether the user input request is for the emergency message by:
comparing a message destination with a list of predefined message destinations;
if the message destination matches a predefined message destination of the list, identifying that the user input request is for the emergency message; and
if the message destination fails to match all predefined message destinations of the list, identifying that the short message is a non-emergency message.

9. The method of claim 1,
wherein the act of identifying whether the user input request is for the emergency message comprises the further act of identifying whether an emergency function provided in the user interface is selected.

10. The method of claim 1, further comprising:
receiving, by the wireless network, the short message having the second message center address in the message center address field; and
providing a message center address corresponding to the emergency message center in the short message for routing the short message to the emergency message center.

11. A mobile communication device, comprising:
one or more processors;
a wireless transceiver coupled to the one or more processors and adapted for communications with a wireless communication network;
a user interface coupled to the one or more processors;
the one or more processors being operative to:
communicate with memory which stores a first message center address associated with a home message center and a second message center address associated with an emergency message center;
receive, through the user interface, a user input request for communicating a short message;
if the user input request is identified as being for an emergency message:
read the second message center address from the memory and providing the second message center address in a message center address field of the short message; and
causing the short message with the second message center address in the message center address field to be transmitted to the wireless communication network via the wireless transceiver for communication to the emergency message center.

12. The mobile communication device of claim 11, wherein the one or more processors are further operative to:
if the user input request is identified as being for a non-emergency message:
read the first message center address from the memory and providing the first message center address in a message center address field of the short message; and
cause the short message with the first message center address in the message center address field to be transmitted for communication via the wireless transceiver to the home message center.

13. The mobile communication device of claim 11, wherein the memory comprises a removable memory module in the mobile communication device.

14. The mobile communication device of claim 11, wherein the one or more processors are further operative to:
receive the second message center address over a broadcast channel of the wireless communication network.

15. The mobile communication device of claim 11, wherein the one or more processors are further operative to:
receive the second message center address over a broadcast channel of the wireless communication network; and
store the second message center address received over the broadcast channel in the memory which comprises a removable memory module.

16. The mobile communication device of claim 11, wherein the one or more processors are further operative to:
receive the second message center address over a broadcast channel of the wireless communication network;
store the emergency message center address in association with a wireless network identification of the wireless communication network in the memory.

17. The mobile communication device of claim 11, wherein the one or more processors are further operative to:
each time the mobile communication device operates with a new one of a plurality of wireless communication networks:
receive the second message center address over a broadcast channel of the wireless communication network; and
store the second message center address in association with a wireless network identification of the wireless communication network in the memory.

18. The mobile communication device of claim 11, wherein the one or more processors are further operative to:
identify whether the user input request is for the emergency message by:
comparing a message destination with a list of predefined message destinations;
if the message destination matches a predefined message destination of the list, identifying that the user input request is for the emergency message; and
if the message destination fails to match all predefined message destinations of the list, identifying that the user input request is for a non-emergency message.

19. The mobile communication device of claim 11, wherein the one or more processors are further operative to:
    identify whether the user input request is for the emergency message by identifying whether an emergency function provided in the user interface is selected.

20. The mobile communication device of claim 11, wherein the one or more processors are further operative to:
    receive, by the wireless network, the short message having the second message center address in the message center address field; and
    provide a message center address corresponding to the emergency message center in the short message for routing the short message to the emergency message center.

* * * * *